(12) United States Patent
Sciarra

(10) Patent No.: US 6,970,888 B1
(45) Date of Patent: Nov. 29, 2005

(54) METHOD AND SYSTEM FOR OBJECT LINKING

(75) Inventor: Peter A. Sciarra, Wildwood Crest, NJ (US)

(73) Assignee: Oracle International Corporation, Redwood Shores, CA (US)

(*) Notice: Subject to any disclaimer, the term of this patent is extended or adjusted under 35 U.S.C. 154(b) by 280 days.

(21) Appl. No.: 09/792,484

(22) Filed: Feb. 23, 2001

(51) Int. Cl.[7] .............................................. G06F 17/30
(52) U.S. Cl. .................... 707/200; 707/1; 707/203; 709/215; 711/173
(58) Field of Search ................. 707/200–206, 707/1–10, 100–104.1; 709/102, 104.1, 118, 709/215; 711/173, 100, 113

(56) References Cited

U.S. PATENT DOCUMENTS

| | | | |
|---|---|---|---|
| 5,706,510 A * | 1/1998 | Burgoon ..................... 707/203 |
| 5,974,517 A * | 10/1999 | Gaudet ....................... 711/173 |
| 6,119,131 A * | 9/2000 | Cabrera et al. ............. 707/203 |
| 6,370,545 B1 * | 4/2002 | Shaath ........................ 707/200 |
| 6,421,684 B1 * | 7/2002 | Cabrera et al. ............. 707/200 |
| 6,496,839 B2 * | 12/2002 | Cabrera et al. ............. 707/203 |
| 6,665,786 B2 * | 12/2003 | McMichael et al. ........ 711/173 |

* cited by examiner

*Primary Examiner*—Shahid Alam
*Assistant Examiner*—Jean Bolte Fleurantin
(74) *Attorney, Agent, or Firm*—Bingham McCutchen LLP

(57) ABSTRACT

Disclosed is a mechanism and method for object linking. According to an aspect of one embodiment of the invention, name linking information is co-located with the storage object, rather than being stored only at a computer node. By maintaining name liking information with a storage object, that name linking information can still be used to correctly associate an alternate name with that storage object, regardless of configuration changes that move or delete storage objects in the system and regardless of any changes to internal identifiers for that storage object.

40 Claims, 6 Drawing Sheets

METHOD AND SYSTEM FOR OBJECT LINKING

BACKGROUND AND SUMMARY

The present invention is directed to a method and mechanism for linking names to storage objects in a computer system. Many storage objects, such as hard disk partitions, are internally identified by computer systems using arbitrary, confusing, or lengthy sequences of numbers or characters which renders the internal identifier difficult to recognize and remember. Thus, more easily recognizable names are often associated with storage objects to provide access and reference to those objects. As just one example, the NT operating system provided by Microsoft Corporation uses "symbolic linking" to associate meaningful names with hard disk partitions. In this approach, the "registry" of the operating system includes information that links a particular hard disk partition with an alternate name that has been chosen for that partition.

To illustrate, consider a computer system 100a as shown in FIG. 1. A computer node 102 is communicatively coupled to a first hard drive 106, a second hard drive 114, and a third hard drive 120. Hard drive 106 includes two partitions 108 and 110. Hard drive 114 includes a single partition 114. Hard drive 120 includes two partitions 116 and 118. Computer node 102 may identify these hard drives and their partitions using an internal identification syntax, such as internal identifiers formed by sequentially numbering each hard drive and partition. Thus, the first partition 108 for the first hard drive 106 could be identified as ":c" (or "Partition_1:HD_1" or any other sequentially based identifier) and the second partition 110 for the first hard drive 106 could be identified as ":d" (or "Partition_2:HD_1"). Similarly, the partition 114 for the second hard drive 114 could be identified as ":e". The first partition 116 for the third hard drive hard 120 could be internally identified as ":f" and the second partition 118 for the same hard drive 120 could be identified as ":g".

To facilitate access to these hard disk partitions, symbolic name links could be used to associate more meaningful names to each partition. For example, if the second partition 110 of the first hard disk 106 (referred to above as ":d" or "Partition_2:HD_1") is heavily utilized by the human resources department of an organization, then a symbolic link may be applied to give a new name "human_resources_partition" to this partition. In effect, the operating system maintains a link between the name "human_resources_partition" and the internal identifier ":d" or "Partition_2:HD_1". Both the internal identification and the more meaningful symbolic name can thereafter be used to access hard disk partition 110.

Consider if computer system 100a is reconfigured to the configuration shown as computer system 100b. In particular, partition 108 has been removed from hard disk 106 and the entire hard disk 114 has been removed from the computer system 100b. As noted above, the internal identification for each partition was established by sequentially numbering/lettering each partition and hard drive. Under this approach, since the configuration of hard drives and partitions have changed, the internal identifications may be reestablished based upon the new sequential numbering lettering of the remaining partitions and hard drives in the computer system 100b. Thus, partition 110, which was formerly the second partition of the first hard drive 106 with internal identification ":d" or "Partition_2:HD_1", is now the first (and only) partition of hard drive 106 with internal identification ":c" or :Partition_1:HD_1", which was the former internal identifier for the removed partition 108.

The problem is that a symbolic link for the name "human_resources_partition" had previously been mapped to the former internal identifier for partition 110, i.e., ":d" or "Partition_2:HD_1", and this symbolic link no longer references its intended partition in the computer system 100b. If the symbolic link is not adequately remapped, the name "human_resources_partition" can no longer be used to access the intended partition 110. Even worse, the renumbering of the internal identifiers could cause the symbolic link to point to another partition that exists in the system that now uses this former linked identifier, resulting in the unintended corruption or deletion of data from another partition.

In a similar manner, the removal of hard disk 114 causes the sequential renumbering of the internal identifiers for hard disk 120 since this hard disk has changed from the third hard disk drive to the second hard disk drive in computer system 100. Thus, the former internal identifiers for partitions 116 and 118, respectively, will change after the reconfiguration of computer system 100b. Any symbolic name links established using the previous internal identifiers would be in error after the reconfiguration of computer system 100b.

This problem is further compounded if multiple network nodes seek to access the same storage device objects across a network, since management of storage devices is often performed locally. This presents additional problems for remote nodes seeking to maintain valid name links in the face of system reconfigurations.

To address these issues, the present invention provides an improved method and mechanism for linking names to storage objects in the computer system. According to an aspect of one embodiment of the invention, name linking information is co-located with the storage object, rather than being stored only at a computer node. By maintaining name liking information with a storage object, that name linking information can still be used to correctly associate an alternate name with that storage object, regardless of configuration changes that move or delete storage objects in the system and regardless of any changes to internal identifiers for that storage object. Further aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

The present invention is directed to a method and mechanism for name linking in a computer system. For illustrative purposes, the description of the disclosed embodiment(s) is directed to symbolic linking for hard disk partitions in a storage system. However, the principles presented herein are equally applicable to other units or granularities of storage objects in a storage system and to other types of name linking in addition to symbolic linking; thus, the scope of the invention is not to be limited to the exact embodiment(s) shown herein.

According to an embodiment of the invention, a symbolic name link associated with a partition is persistently co-located with the partition. By maintaining symbolic name link information with the partition, that symbolic name link information can still be used to correctly associate a symbolic name with its corresponding partition even if a configuration change occurs that moves the partition to a different location in the computer system. If a partition moves to another location in the computer system or any other configuration change occurs that affects the internal identifier for the partition, any computer node merely needs to access the symbolic link information stored with the partition to identify its symbolic name link, regardless of the internal identifier that is later associated with that partition.

Figure 1:
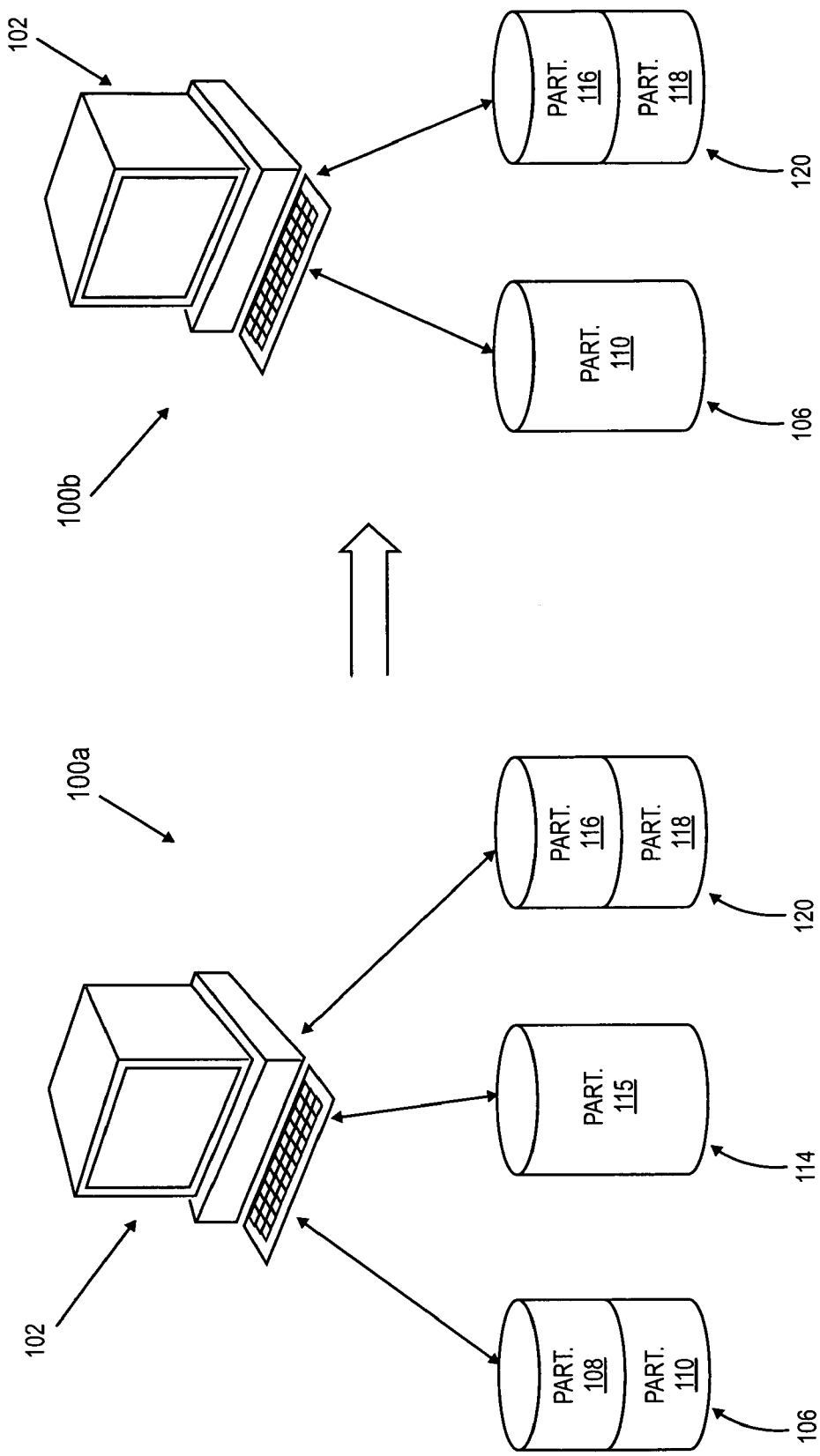
FIG. 1 shows a configuration change to storage objects in a computer system.
Figure 2:
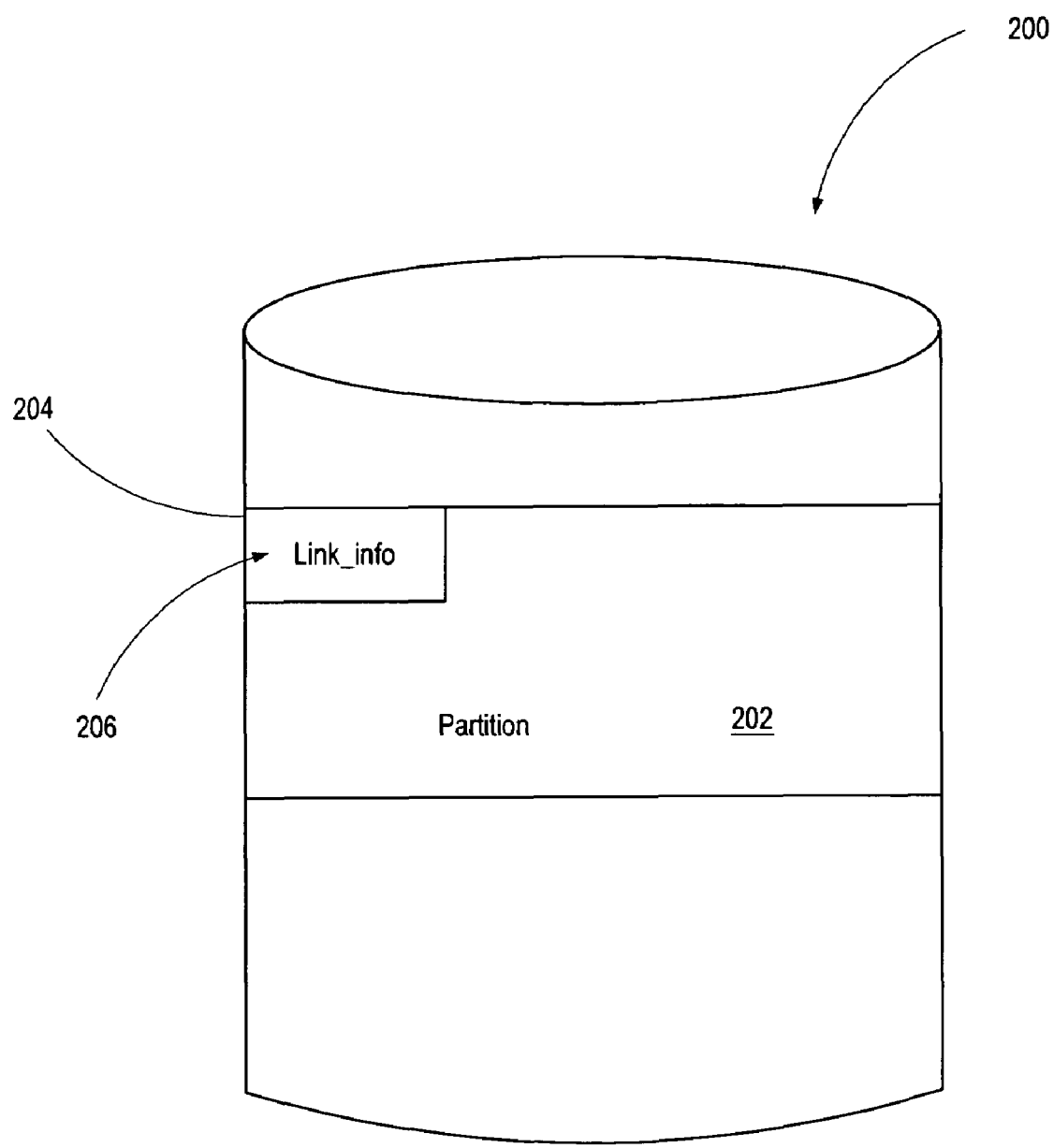
FIG. 2 shows symbolic name link information co-located with a partition according to an embodiment of the invention.

Referring to FIG. 2, shown is an embodiment of the invention in which a hard disk 200 includes a partition 202. A portion 204 of the partition 202 is configured to store and maintain symbolic link information 206 for that partition. In an embodiment, the symbolic name link information is stored in the partition table of a partition. A partition table is a portion of the partition containing metadata information for the partition. In some operating systems, such as an NT-based operating system, the disk sector in which a partition table is located often contains excess bytes that can be employed to store symbolic link information for that partition. However, it is noted that the exact location of symbolic link information in or with a partition is a matter of design choice and is not to be limiting as to the scope of the invention.

Figure 3:
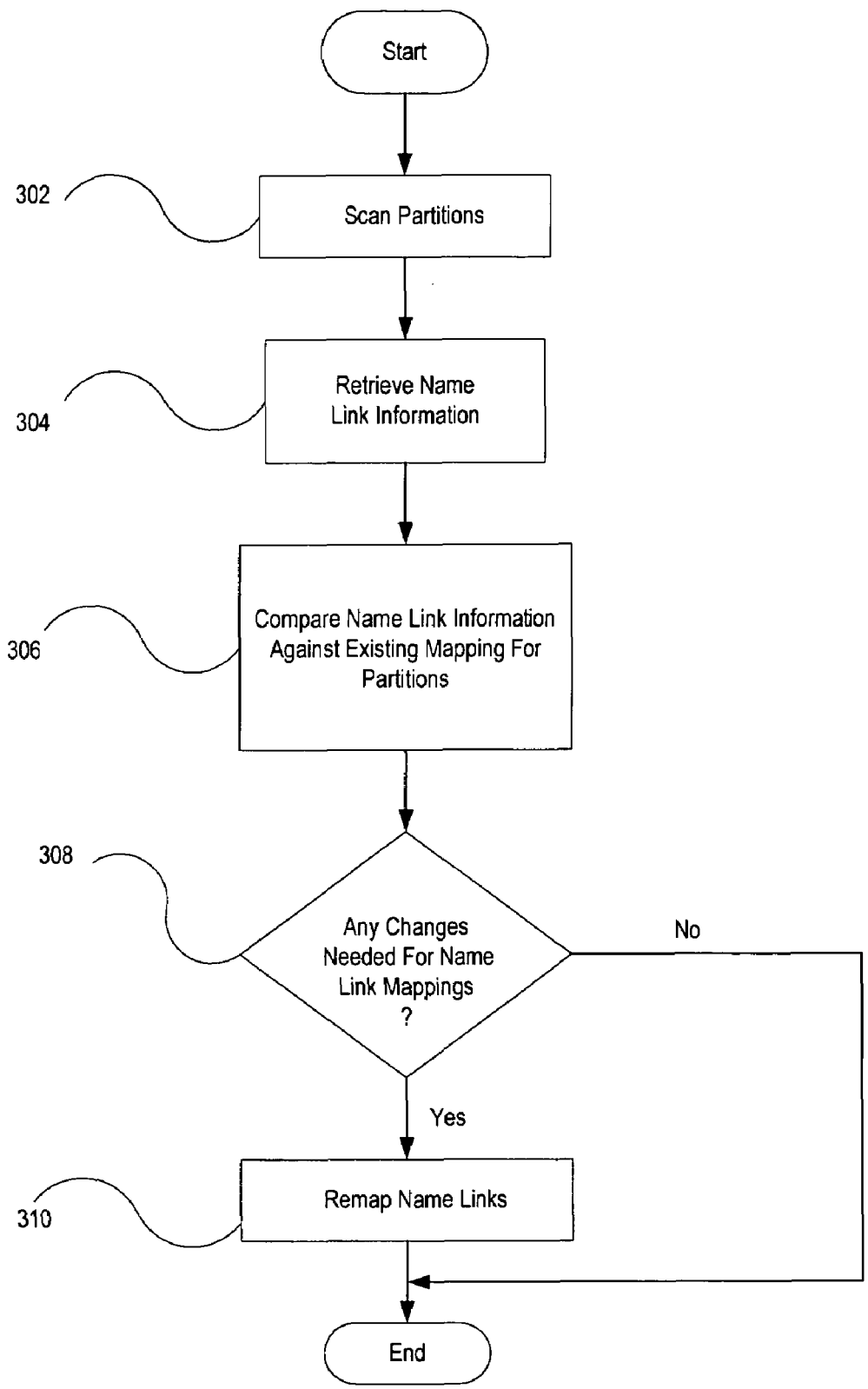
FIG. 3 is a flowchart of a process for mapping symbolic links with partitions according to an embodiment of the invention.

FIG. 3 depicts a flowchart of a process for mapping symbolic links to partitions according to an embodiment of the invention. The process begins when a computer node scans the symbolic link information located in the partitions in the computer system (302). The occurrence of a number of events may prompt the computer node to begin the scanning action of 302. For example, the computer node may undergo a boot-up sequence and the scanning action is taken to ensure that symbolic link mappings are correct for that computer node. Likewise, a change in configuration of the computer system could prompt such an action, e.g., the removal, addition, or movement of storage devices in the computer system. Note that in a distributed computing environment, some or all of the partitions may be remotely located and not directly coupled to the computer node. Thus, the action of scanning for symbolic link information may involve network messaging to retrieve this information from remotely located hard drives controlled by other computer nodes.

The computer node scans the partitions to retrieve symbolic link information (304). In an embodiment, this action comprises scanning the partition table for each partition to search for symbolic names linked to the partitions. The next action is to compare the retrieved symbolic link information with the symbolic link information already mapped by the operating system for that computer node (306). For a computer system utilizing the NT operating system, the pre-existing mapping information for symbolic links is located in the system registry. Alternatively, a computer node could maintain a separate set of data to track symbolic links outside of the system registry, e.g., in a database table. Regardless of the manner in which pre-existing symbolic link mapping information is maintained at a computer node, that information is compared against retrieved symbolic link information from the partitions.

A determination is made whether there exists any inconsistencies between the symbolic link mapping information maintained by a node and the symbolic link information retrieved from the partitions (308). Identification of such inconsistencies means that one or more invalid symbolic name link mapping exists for the computer node. These inconsistencies may exist, for example, if a configuration change has occurred because of the addition, removal, or movement of storage objects or devices in the computing system. In addition, such inconsistencies may result from reassignment or resequencing of internal identifiers for storage objects by the operating system.

If inconsistencies for symbolic links are identified, then each of the erroneous symbolic name link mappings at the computer node are corrected to be consistent with corresponding symbolic links retrieved from the partitions (310). This remapping of symbolic links at the computer node ensures that the operating system will be able to correctly reference hard disk partitions using established symbolic name links. If the invention is applied to the NT operating system, then the system registry is updated with the correct list of symbolic links at step 310. The operating system's object management services may be called to correctly map internal identifiers, e.g., drive letters, to symbolic link names.

An aspect of the invention pertains to distributed administration of symbolic link mappings. Each computer node in the computing system can be remotely administered to perform a resynchronization of symbolic link mappings. According to an embodiment of the invention, updates to symbolic links are administered without requiring all computer nodes to reboot, in which symbolic links are dynamically remapped at the computer nodes.

According an embodiment, each computer node includes a listener process that is associated with a designated port number. The listener process checks the port for any messages from other computer nodes or storage devices that would indicate a configuration change possibly requiring remapping of symbolic links. For example, when a computer node or storage device completes a configuration change involving storage objects such as partitions or hard drives, a message is sent to each computer node at the designated port number to resynchronize their symbolic link mappings. This message could be sent from a central administrative node, or alternatively, from the node or storage device involved in the reconfiguration. The message notifies the distributed computer nodes of a possibility that their symbolic link mappings may now be outdated.

When the listener process at a computer node receives this message, that computer node will initiate a scan of the hard disk partitions to retrieve the latest symbolic link information existing in the computing system. The computer node then performs a comparison between symbolic link information retrieved from the partitions and the symbolic link information maintained at the computer node. To facilitate this comparison, a set of data, e.g., a database table, can be maintained that lists all symbolic links for that computer node. If there an inconsistency exists between the symbolic link information maintained by the computer node and the retrieved symbolic link information from the partitions, then the symbolic link information at the node is remapped to match the latest symbolic link information from the partitions.

Various scenarios exist for causing a message to be sent to the computer nodes to resynchronize their symbolic link mappings. For example, as described above, a configuration change in the system may initiate such a message. Another event that may prompt this message is the occurrence of an access error by any node in the system. If such an error occurs, then the node receiving the error propagates the message to alert other nodes to the possibility that existing symbolic link mappings are in error.

Figure 4:
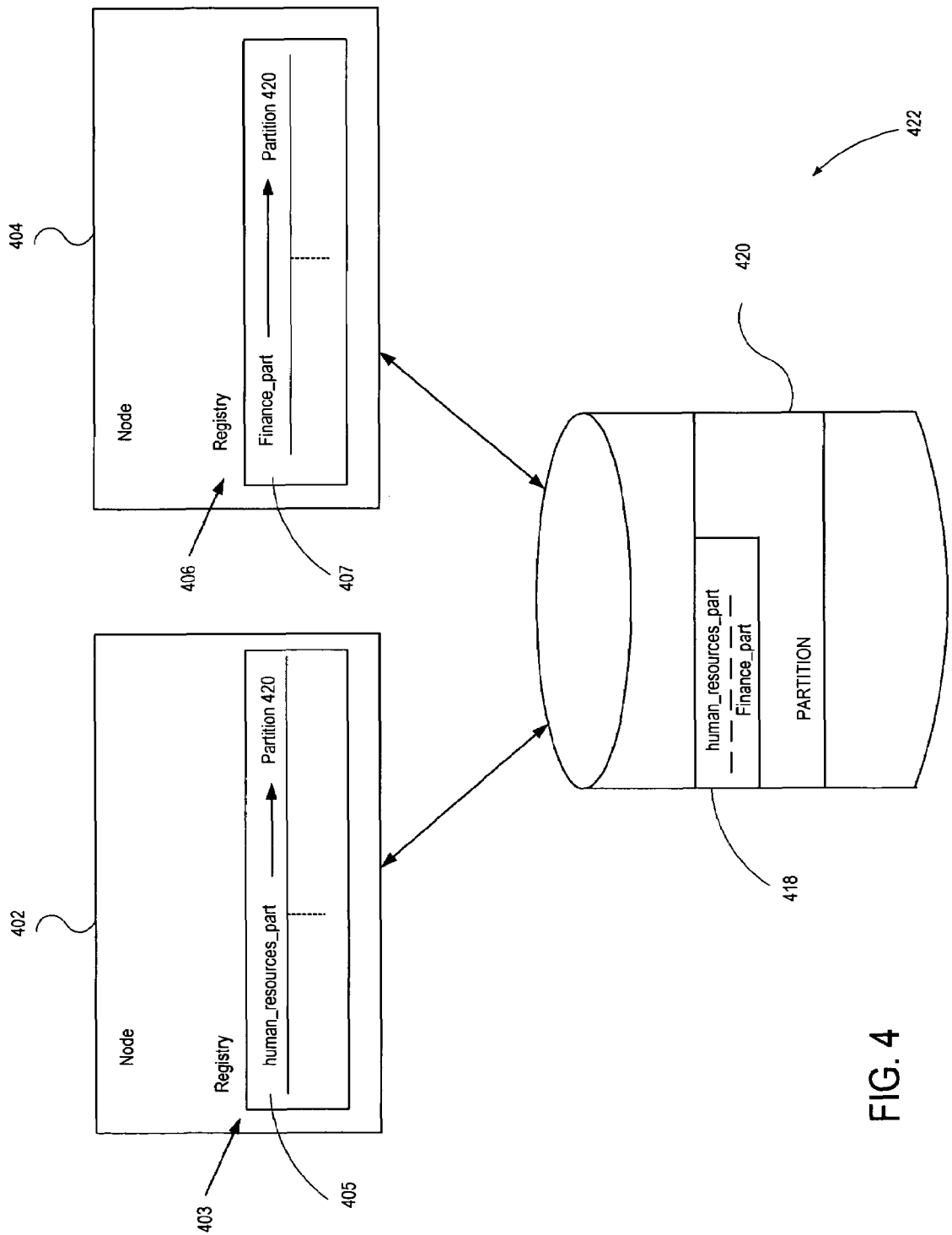
FIG. 4 shows an embodiment of the invention in which a partition is co-located with multiple symbolic link information.

Multiple types and/or quantities of symbolic link information may be located in or with the partitions. Referring to FIG. 4, an embodiment of the invention is shown in which a partition is associated with multiple symbolic name links. The registry 403 of a first computer node 402 contains a symbolic link entry 405 that links the name "human_resources_part" to partition 420 of disk drive 422. Users on computer node 402 may therefore access partition 420 using the symbolic name human_resources_part. The registry 406 of a second computer node 404 may contain a symbolic link entry 407 that links the name "finance_part" to the same partition 420. Users on computer node 404 may therefore access partition 420 using the symbolic link name "finance_part".

The partition table 418 of partition 420 includes both sets of symbolic link information according to an embodiment of the invention. Thus, both the symbolic link for name "human_resources_part" and the symbolic link for name "finance_part" may be located in the partition table 418 of partition 420. In an embodiment, the symbolic link information located at the partition may contain information that specifically associates symbolic links with particular computer nodes. Thus, the symbolic link information for the symbolic name "human_resources_part" at partition 420 would contain identifiers for any corresponding computer nodes that uses that symbolic name, e.g., computer node 402. Similarly, the symbolic link information for the symbolic name "finance_part" at partition 420 contains identifiers for the symbolic name "finance_part" for all of its corresponding computer nodes, e.g., computer node 404.

In an alternate embodiment, the partition table 418 does not contain information associating symbolic link names with specific computer nodes. Instead, when the symbolic link information is retrieved by a computer node, all the symbolic link information located at the partition 420 are retrieved and used for mapping at that computer nodes. If the partition is associated with multiple symbolic link names, then all of the symbolic link names are mapped at the computer node. Thus, in this approach, computer nodes 402 and 404 may use either or both symbolic names "human_resources_part" and "finance_part" to refer to partition 420.

System Architecture Overview

Figure 5:
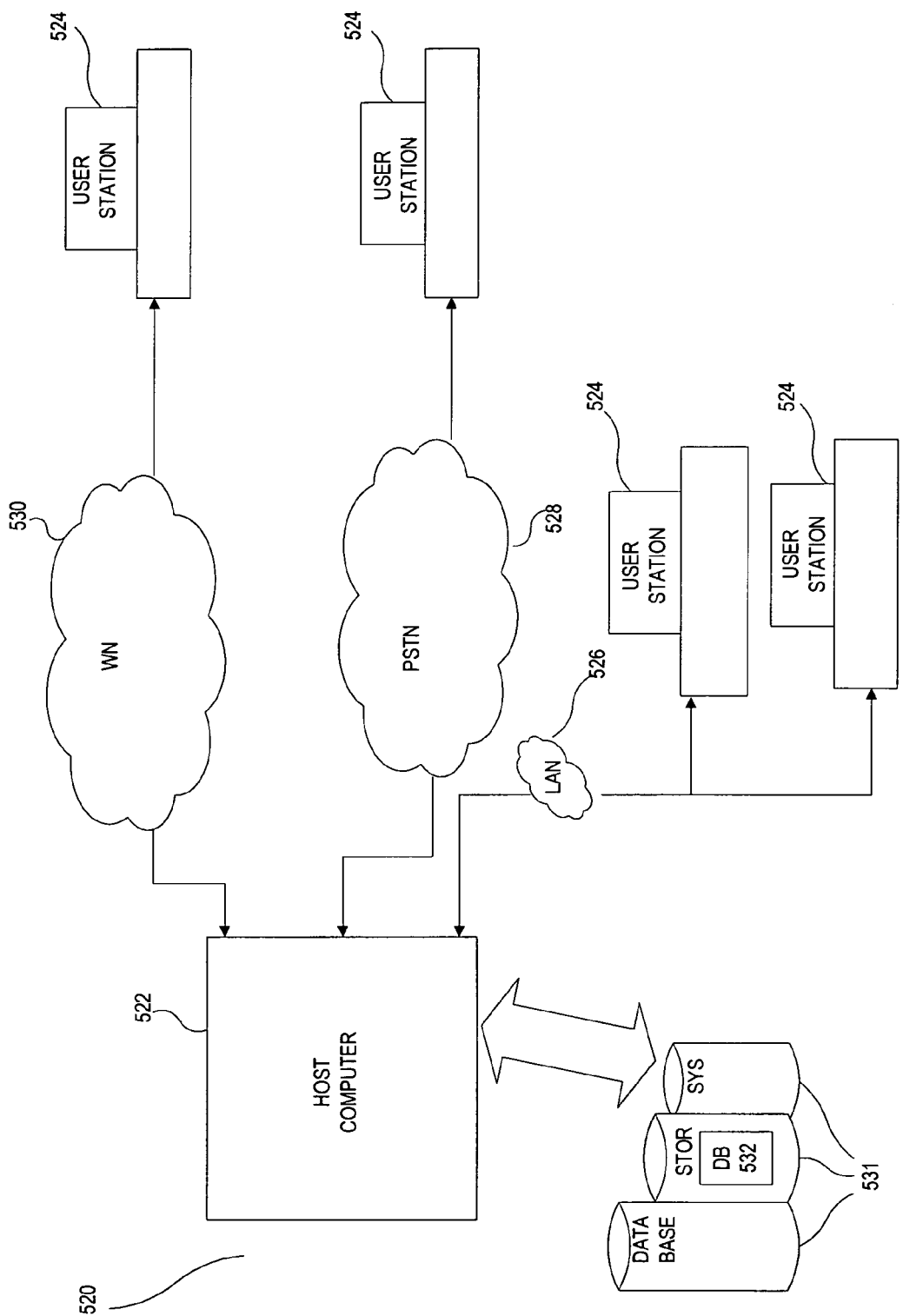
FIGS. 5 and 6 are diagram of system architectures with which the present invention may be implemented.

Referring to FIG. 5, in an embodiment, a computer system 520 includes a host computer 522 connected to a plurality of individual user stations 524. In an embodiment, the user stations 524 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 524 are connected to the host computer 522 via a local area network ("LAN") 526. Other user stations 524 are remotely connected to the host computer 522 via a public telephone switched network ("PSTN") 528 and/or a wireless network 530.

In an embodiment, the host computer 522 operates in conjunction with a data storage system 531, wherein the data storage system 531 contains a database 532 that is readily accessible by the host computer 522. Note that a multiple tier architecture can be employed to connect user stations 524 to a database 532, utilizing for example, a middle application tier (not shown). In alternative embodiments, the database 532 may be resident on the host computer, stored, e.g., in the host computer's ROM, PROM, EPROM, or any other memory chip, and/or its hard disk. In yet alternative embodiments, the database 532 may be read by the host computer 522 from one or more floppy disks, flexible disks, magnetic tapes, any other magnetic medium, CD-ROMs, any other optical medium, punchcards, papertape, or any other physical medium with patterns of holes, or any other medium from which a computer can read. In an alternative embodiment, the host computer 522 can access two or more databases 532, stored in a variety of mediums, as previously discussed.

Figure 6:
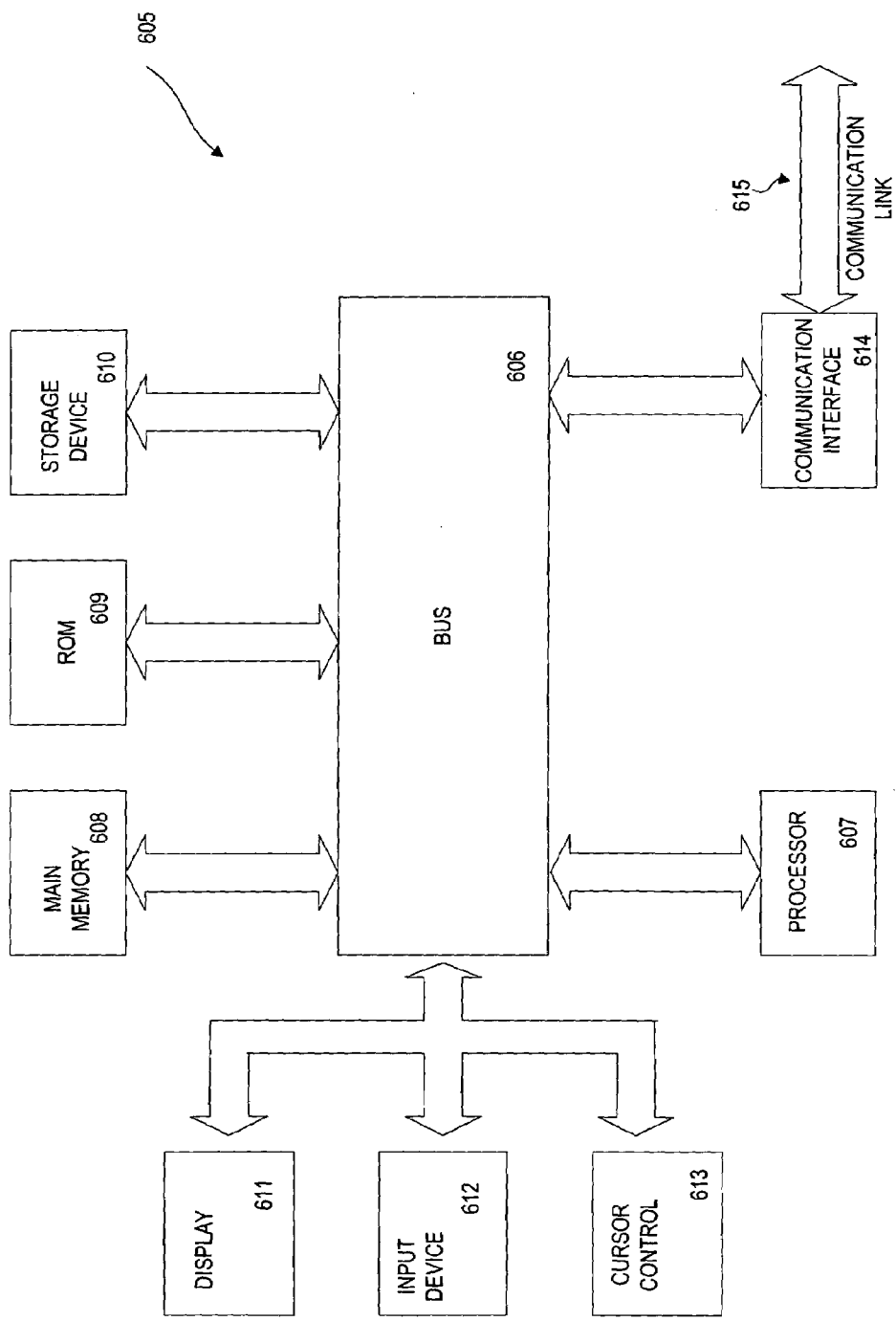

Referring to FIG. 6, in an embodiment, each user station 524 and the host computer 522, each referred to generally as a processing unit, embodies a general architecture 605. A processing unit includes a bus 606 or other communication mechanism for communicating instructions, messages and data, collectively, information, and one or more processors 607 coupled with the bus 606 for processing information. A processing unit also includes a main memory 608, such as a random access memory (RAM) or other dynamic storage device, coupled to the bus 606 for storing dynamic data and instructions to be executed by the processor(s) 607. The main memory 608 also may be used for storing temporary data, i.e., variables, or other intermediate information during execution of instructions by the processor(s) 607. A processing unit may further include a read only memory (ROM) 609 or other static storage device coupled to the bus 606 for storing static data and instructions for the processor(s) 607. A storage device 610, such as a magnetic disk or optical disk, may also be provided and coupled to the bus 606 for storing data and instructions for the processor(s) 607.

A processing unit may be coupled via the bus 606 to a display device 611, such as, but not limited to, a cathode ray tube (CRT), for displaying information to a user. An input device 612, including alphanumeric and other columns, is coupled to the bus 606 for communicating information and command selections to the processor(s) 607. Another type of user input device may include a cursor control 613, such as, but not limited to, a mouse, a trackball, a fingerpad, or cursor direction columns, for communicating direction information and command selections to the processor(s) 607 and for controlling cursor movement on the display 611.

According to one embodiment of the invention, the individual processing units perform specific operations by their respective processor(s) 607 executing one or more sequences of one or more instructions contained in the main memory 608. Such instructions may be read into the main memory 608 from another computer-usable medium, such as the ROM 609 or the storage device 610. Execution of the sequences of instructions contained in the main memory 608 causes the processor(s) 607 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 607. Such a medium may take many forms, including, but not limited to, non-volatile, volatile and transmission media. Non-volatile media, i.e., media that can retain information in the absence of power, includes the ROM 609. Volatile media, i.e., media that can not retain information in the absence of power, includes the main memory 608. Transmission media includes coaxial cables, copper wire and fiber optics, including the wires that comprise the bus 606. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 607 can retrieve information. Various forms of computer-usable media may be involved in providing one or more sequences of one or more instructions to the processor(s) 607 for execution. The instructions received by the main memory 608 may optionally be stored on the storage device 610, either before or after their execution by the processor(s) 607.

Each processing unit may also include a communication interface 614 coupled to the bus 606. The communication interface 614 provides two-way communication between the respective user stations 624 and the host computer 622. The communication interface 614 of a respective processing unit transmits and receives electrical, electromagnetic or optical signals that include data streams representing various types of information, including instructions, messages and data. A communication link 615 links a respective user station 624 and a host computer 622. The communication link 615 may be a LAN 526, in which case the communication interface 614 may be a LAN card. Alternatively, the communication link 615 may be a PSTN 528, in which case the communication interface 614 may be an integrated services digital network (ISDN) card or a modem. Also, as a further alternative, the communication link 615 may be a wireless network 530. A processing unit may transmit and receive messages, data, and instructions, including program, i.e., application, code, through its respective communication link 615 and communication interface 614. Received program code may be executed by the respective processor(s) 607 as it is received, and/or stored in the storage device 610, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A process for linking a symbolic name to a hard disk drive partition at a computer node, comprising;
    linking a symbolic name with a hard disk partition;
    co-locating information for the symbolic name of the hard disk partition in the hard disk partition;
    retrieving the information for the symbolic name from the partition to a computer node;
    comparing the information for the symbolic name retrieved from the partition to mapped symbolic name information which is pre-existing at the computer node; and
    remapping the mapped symbolic name information pre-existing at the computer node if an inconsistency is identified by the comparison of the retrieved symbolic name information and the pre-existing symbolic name information.

2. The process of claim 1 in which the information for the symbolic name is located in the hard disk partition.

3. The process of claim 2 in which the information is located in a partition table in the hard disk partition.

4. The process of claim 1 in which a reboot sequence at the computer node causes the action of retrieving the information for the symbolic name.

5. The process of claim 1 in which a configuration change for storage objects causes the action of retrieving the information for the symbolic name.

6. The process of claim 1 in which an access error cause the action of retrieving the information for the symbolic name.

7. The process of claim 1 in which the mapped symbolic name information comprises information in a registry at the computer node.

8. The process of claim 1 in which the computer node listens for a message to initiate the action of retrieving the information for the symbolic name.

9. The process of claim 8 in which a designated port is maintained to listen for the message to initiate the action of retrieving the information for the symbolic name.

10. The process of claim 8 in which the message to initiate the action of retrieving the information for the symbolic name is sent from another node that experiences an access error.

11. The process of claim 8 in which the message to initiate the action of retrieving the information for the symbolic name is initiated from another node that causes a configuration change.

12. The process of claim 1 in which the act of remapping the mapped symbolic name information is performed without rebooting the computer node.

13. The process of claim 1 in which a second symbolic name is linked to the hard disk partition and a second information for the second symbolic link is co-located with the hard disk partition.

14. The process of claim 1 in which the mapped symbolic name information at the computer node is maintained as a separate structure from operating system files for the computer node.

15. The process of claim 14 in which the separate structure comprises a database table.

16. A process for linking an alternate name to a storage object in a computer system, comprising:

associating the alternate name to the storage object;

co-locating the alternate name association with the storage object;

comparing the alternate name association co-located with the storage object with alternate name mappings maintained by a computer node that accesses the storage object;

identifying an inconsistency between the alternate name association at the storage object and the alternate name mappings maintained by the computer node; and in response to identifying the inconsistency, correcting the alternate name mappings at the computer node to become consistent with the alternate name association co-located with the storage object.

17. The process of claim 16 in which the alternate name is a symbolic name.

18. The process of claim 17 in which the alternate name association is a symbolic link.

19. The process of claim 16 in which a reboot sequence at the computer node causes the action of comparing the alternate name association at the storage object with the alternate name mappings maintained by the computer node that accesses the storage object.

20. The process of claim 16 in which a configuration change for the storage object causes the action of comparing the alternate name association at the storage object with the alternate name mappings maintained by the computer node that accesses the storage object.

21. The process of claim 16 in which the computer node listens for a message to initiate the action of comparing the alternate name association at the storage object with the alternate name mappings maintained by the computer node that accesses the storage object.

22. The process of claim 21 in which a designated port is maintained to listen for the message to initiate the action of comparing the alternate name association at the storage object with the alternate name mappings maintained by the computer node that accesses the storage object.

23. The process of claim 16 in which the act of correcting the alternate name mappings at the computer node to become consistent with the alternate name association co-located with the storage object is performed without rebooting the computer node.

24. The process of claim 16 in which the alternate name association is located in the storage object.

25. The process of claim 16 in which the alternative name mappings at the computer node is maintained as a separate structure from operating system files for the computer node.

26. The process of claim 25 in which the separate structure comprises a database table.

27. A computer program product that includes a computer-usable medium having a sequences of instruction which, when executed by a processor, causes said processor to execute a process for linking a symbolic name to a hard disk drive partition at a computer node, said process comprising:

linking a symbolic name with a hard disk partition;

co-locating information for the symbolic name of the hard disk partition in the hard disk partition;

retrieving the information for the symbolic name from the partition to a computer node;

comparing the information for the symbolic name retrieved from the partition to mapped symbolic name information which is pre-existing at the computer node; and remapping the mapped symbolic name information pre-existing at the computer node if an inconsistency is identified by the comparison of the retrieved symbolic name information and the pre-existing symbolic name information.

28. The computer program product of claim 27 in which the information for the symbolic name is located in the hard disk partition.

29. The computer program product of claim 27 in which retrieving the information for the symbolic name is caused by a reboot sequence at the computer node, a configuration change for storage objects, or an access error.

30. The computer program product of claim 27 in which the computer node listens for a message to initiate the action of retrieving the information for the symbolic name.

31. The computer program product of claim 30 in which the message to initiate the action of retrieving the information for the symbolic name is sent from another node that experiences an access error or is initiated from another node that causes a configuration change.

32. The computer program product of claim 27 in which the act of remapping the mapped symbolic name information is performed without rebooting the computer node.

33. The computer program product of claim 27 in which a second symbolic name is linked to the hard disk partition and a second information for the second symbolic link is co-located with the hard disk partition.

34. A computer program product that includes a computer-usable medium having a sequence of instruction which, when executed by a processor, causes said processor to execute a process for linking an alternate name to a storage object in a computer system, said process comprising:

associating the alternate name to the storage object;

co-locating the alternate name association with the storage object;

comparing the alternate name association co-located with the storage object with alternate name mappings maintained by a computer node that accesses the storage object;

identifying an inconsistency between the alternate name association at the storage object and the alternate name mappings maintained by the computer node; and in response to identifying the inconsistency, correcting the alternate name mappings at the computer node to become consistent with the alternate name association co-located with the storage object.

35. The computer program product of claim 34 in which an alternate name is a symbolic name.

36. The computer program product of claim 35 in which an alternate name association is a symbolic link.

37. The computer program product of claim 34 in which comparing the alternate name association at the storage object with the alternate name mappings maintained by the computer node that accesses the storage object is caused by a reboot sequence at the computer node or a configuration change for the storage object.

38. The computer program product of claim 34 in which the computer node listens for a message to initiate the action of comparing the alternate name association at the storage object with the alternate name mappings maintained by the computer node that accesses the storage object.

39. The computer program product of claim 34 in which the act of correcting the alternate name mappings at the computer node to become consistent with the alternate name association co-located with the storage object is performed without rebooting the computer node.

40. The computer program product of claim 34 in which the alternate name association is located in the storage object.

* * * * *